United States Patent
Shimizu et al.

(10) Patent No.: US 7,802,925 B2
(45) Date of Patent: Sep. 28, 2010

(54) OPTICAL RECEPTACLE AND OPTICAL RECEPTACLE MODULE

(75) Inventors: Junichi Shimizu, Kanagawa (JP); Akihiro Ito, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 4 days.

(21) Appl. No.: 12/389,109

(22) Filed: Feb. 19, 2009

(65) Prior Publication Data

US 2009/0226136 A1   Sep. 10, 2009

(30) Foreign Application Priority Data

Mar. 7, 2008   (JP)   ............... 2008-057712

(51) Int. Cl.
G02B 6/38 (2006.01)

(52) U.S. Cl. ............... 385/60; 385/53; 385/56; 385/66; 385/70; 385/72; 385/84; 385/137; 385/139

(58) Field of Classification Search ............... 385/52, 385/53, 56, 58, 60, 62, 66, 68, 70, 72, 78, 385/84, 139, 134, 136, 137, 138
See application file for complete search history.

(56) References Cited

U.S. PATENT DOCUMENTS

| 4,699,458 A | * | 10/1987 | Ohtsuki et al. ............... 385/59 |
| 4,896,938 A | * | 1/1990 | Mathis et al. ............... 385/70 |
| 5,317,663 A | * | 5/1994 | Beard et al. ............... 385/70 |
| 5,680,494 A | * | 10/1997 | Kaas ............... 385/56 |
| 5,751,874 A | * | 5/1998 | Chudoba et al. ............... 385/72 |
| 6,210,045 B1 | * | 4/2001 | Dean et al. ............... 385/72 |
| 7,461,980 B2 | * | 12/2008 | Han et al. ............... 385/60 |
| 2007/0058906 A1 | * | 3/2007 | Han et al. ............... 385/60 |
| 2009/0226136 A1 | * | 9/2009 | Shimizu et al. ............... 385/60 |

FOREIGN PATENT DOCUMENTS

| JP | 2001-66468 A | 3/2001 |
| JP | 2003-107288 A | 4/2003 |
| JP | 2004-258164 A | 9/2004 |
| JP | 2004-325605 A | 11/2004 |
| JP | 2007-79422 A | 3/2007 |

* cited by examiner

Primary Examiner—Brian M Healy
(74) Attorney, Agent, or Firm—Sughrue Mion, PLLC (57) ABSTRACT

An SC-type optical receptacle includes a first and a second holder each having a hollow chamber longitudinally penetrating therethrough, and a hollow cylindrical sleeve fitted in the chamber of the holders to thereby retain the frontal facets of a pair of ferrules so as to keep the frontal facets butted to each other. The wall thickness of the sleeve is constant over the entire length thereof, and is not less than 0.55 mm.

12 Claims, 9 Drawing Sheets

FIG. 1

PRIOR ART

OPTICAL RECEPTACLE AND OPTICAL RECEPTACLE MODULE

This application is based on Japanese patent application No. 2008-057712, the content of which is incorporated hereinto by reference.

BACKGROUND

1. Field of the Invention

The present invention relates to an optical receptacle to be used for optical communication through an optical fiber, and to an optical receptacle module including the optical receptacle and an optical element.

2. Related Art

The recent popularization of wide area network such as the Internet and Intranet, and the sharp increase in communication traffic have been promoting the expansion of optical communication network. In particular, the technique of high-speed optical communication through an optical fiber (hereinafter, "optical fiber communication technique") is rapidly spreading in the market, as this is employed for attaining a large transmission capacity in the field of data storage, in addition to the use in the Fiber To The Home (FTTH) system, in which the optical fiber is drawn into each home. In an optical communication apparatus an optical transceiver is incorporated, and serves to convert an optical signal to an electrical signal, and vice versa.

The optical transceiver generally includes therein an optical receptacle module removably connectible to an optical connector plug. The optical receptacle module is constituted of either or both of a combination of a light emitting element and an optical receptacle, and a combination of a photodetector and the optical receptacle. The optical transceiver is designed in compliance with standards such as Small Form factor Pluggable (SFP), 10(X) Gigabit EtherNet transceiver PAcKage (XENPAK), and 10(X) Gigabit Small Form Factor Pluggable (XFP). Conventional techniques related to the optical receptacle module employed in such optical transceiver can be found, for example, in JP-A No. 2004-258164, JP-A No. 2004-325605, JP-A No. 2003-107288, JP-A No. 2007-079422, and JP-A No. 2001-66468.

Figure 1:
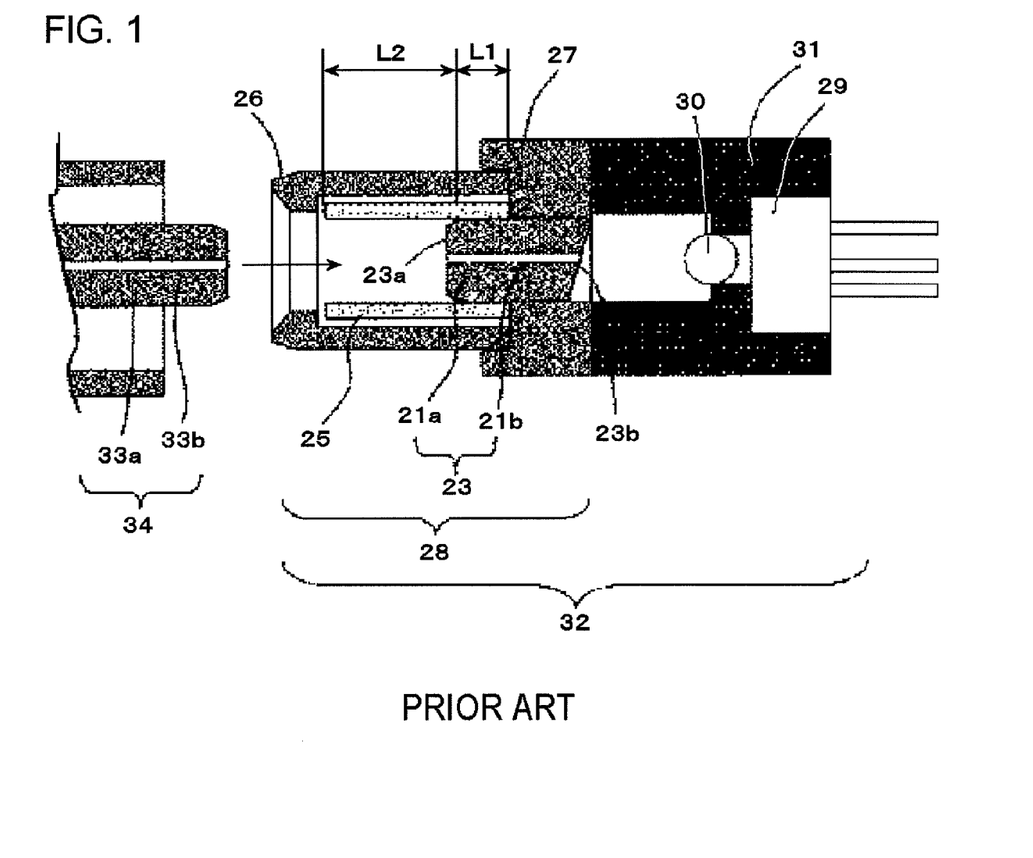
FIG. 1 is a schematic cross-sectional view showing a structure of a conventional optical receptacle module (optical module)

FIG. 1 schematically shows a cross-sectional structure of the optical receptacle module (optical module) 32 according to JP-A No. 2004-258164. The optical receptacle module 32 receives a frontal facet of a plug ferrule 33a of an optical connector 34, which is butted to a frontal facet of a ferrule 21a constituting a part of a fiber stub 23, thus to be optically coupled. The through hole of the ferrule 21a includes an optical fiber 21b, and the through hole of the mating plug ferrule 33a also includes an optical fiber 33b. At a rear end of the optical receptacle 28, an optical element 29 is provided. The optical element 29 is either a light emitting element or a photodetector, fixed in a housing 31 to be optically coupled with the optical receptacle 28 via a lens 30. The optical receptacle 28 includes a fiber stub 23, a sleeve 25, a housing 26 and a holder 27. A frontal facet 23a and a rear facet 23b of the fiber stub 23 are both mirror-finished, to minimize connection loss of an optical signal.

The sleeve 25 is enclosed in the housing 26 fixed to the holder 27, and serves to fasten the outer circumferential surface of a tip portion of the fiber stub 23 to thereby stabilize the optical axis of the fiber stub 23. Once the frontal facet of the plug ferrule 33a is inserted into the housing 26 and butted to the frontal facet of the ferrule 21a, the optical fiber 33b in the plug ferrule 33a and the optical fiber 21b in the ferrule 21a are optically coupled, thereby enabling exchanging optical signals between the optical fibers 21b and 33b.

The present inventor has discovered, however, that the structure of the conventional optical receptacle does not always secure sufficient load resistance, for the following reason. The optical receptacle module is connected to various equipments through a patch cord that includes a plug ferrule. In some occasions a plurality of patch cords is tied in a bundle, which is a situation where each plug ferrule is prone to suffer a lateral load or a momentum load. In case such load is imposed in excess of the elastic retention force of the sleeve enclosed in the optical receptacle, positional displacement, in other words optical axis displacement takes place between the frontal facets of the ferrules, which generates connection loss of the optical signal. Such connection loss may jeopardize the power budget in the optical communication system. Also, the performance expected from the optical transceiver largely depends on the performance of the optical receptacle module to be incorporated therein. Accordingly, the optical transceiver is required, as a part of the performance thereof, to suppress the fluctuation of the connection loss of the optical signal originating from the load imposed on the optical receptacle to be, for example, 1.5 dB or lower in the case of an SC-type optical receptacle, and 0.5 dB or lower in the case of an LC-type optical receptacle. Such performance will hereinafter be referred to as "load resistance".

JP-A No. 2004-325605 discloses a reinforced structure in which one of the open ends of the sleeve in the longitudinal direction is made thicker than the other open end. In such reinforced structure, however, since the former open end has greater retention force than the latter open end, when the lateral load or momentum load is imposed on the optical receptacle, the former open end may act as a lever fulcrum with respect to the ferrule inserted into the sleeve, thereby increasing the optical axis displacement, and hence the connection loss. Besides, partially increasing the thickness of the sleeve leads to an increase in manufacturing cost.

The present invention has been accomplished in view of the foregoing situation, and provides an optical receptacle with a sleeve of a relatively simple structure, yet capable of providing sufficient load resistance, and an optical receptacle module including such optical receptacle.

SUMMARY

In one embodiment, there is provided an SC-type optical receptacle that optically couples a frontal facet of a pair of ferrules each having a through hole in which an optical fiber is provided. The SC-type optical receptacle comprises a holder including a hollow chamber longitudinally penetrating therethrough, and a hollow cylindrical sleeve fitted in the chamber of the holder to thereby retain the frontal facets of the pair of ferrules so as to keep the frontal facets butted to each other, and a wall thickness of the sleeve is constant over an entire length thereof, and is equal to or more than 0.55 mm.

In another embodiment, there is provided an LC-type optical receptacle that optically couples a frontal facet of a pair of ferrules each encloses therein an optical fiber. The LC-type optical receptacle comprises a holder including a hollow chamber longitudinally penetrating therethrough, and a hollow cylindrical sleeve fitted in the chamber of the holder to thereby retain the frontal facets of the pair of ferrules so as to keep the frontal facets butted to each other, and a wall thickness of the sleeve is constant over an entire length thereof, and is equal to or more than 0.25 mm.

In still another embodiment, there is provided an optical receptacle module comprising the optical receptacle, and an optical element optically coupled with a rear end portion of a stub ferrule of one of the pair of ferrules.

The SC-type optical receptacle and the optical receptacle module thus constructed include the sleeve having a wall thickness which is constant over the entire length thereof and is equal to or more than 0.55 mm. Such structure provides sufficient load resistance despite being relatively simple, and permits manufacturing at a low cost. Likewise, the LC-type optical receptacle and the optical receptacle module thus constructed include the sleeve having a wall thickness which is constant over the entire length thereof and is equal to or more than 0.25 mm. Such structure provides sufficient load resistance despite being relatively simple, and permits manufacturing at a low cost.

BRIEF DESCRIPTION OF THE DRAWINGS

The above and other objects, advantages and features of the present invention will be more apparent from the following description taken in conjunction with the accompanying drawings, in which.

DETAILED DESCRIPTION

The present invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereunder, an exemplary embodiment according to the present invention will be described, referring to the accompanying drawings. In all the drawings, the same constituents will be given the same numeral, and the description thereof will not be repeated.

Figure 2:
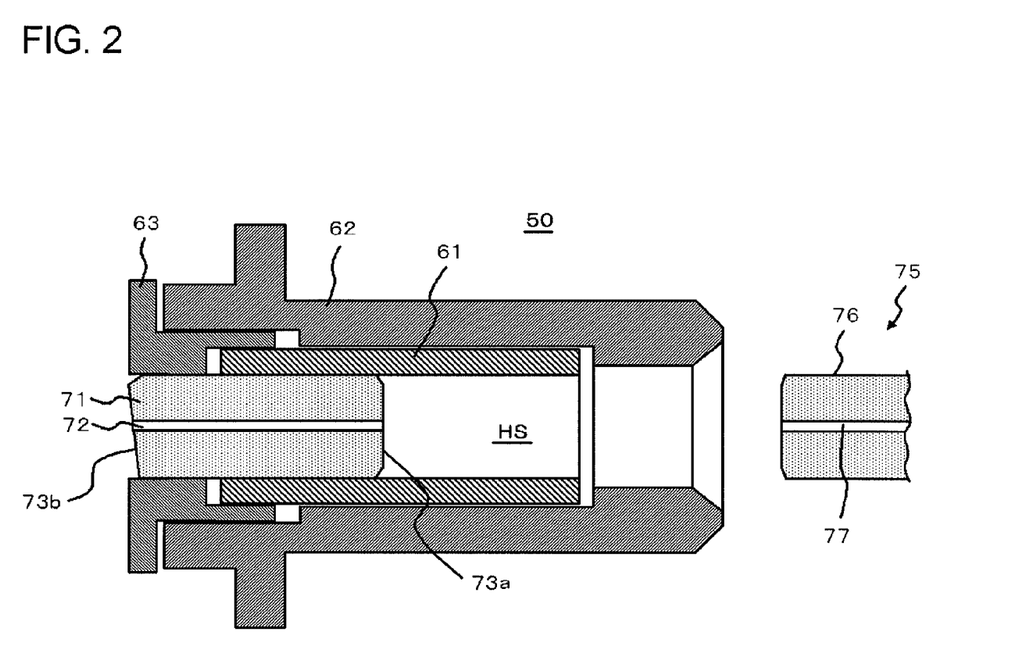
FIG. 2 is a schematic cross-sectional view showing a structure of an optical receptacle according to an embodiment of the present invention.

FIG. 2 is a schematic cross-sectional view showing a structure of an optical receptacle 50 according to the embodiment of the present invention. The optical receptacle 50 includes a stub ferrule 71 with an optical fiber 72. The optical receptacle 50 is designed to optically couple, when an optical connector 75 is inserted through the front end portion thereof, the frontal facet of a plug ferrule 76 constituting a part of the optical connector 75 and of the stub ferrule 71. The stub ferrule 71 includes a through hole through which the optical fiber 72 is inserted, and the plug ferrule 76 includes a through hole through which the optical fiber 77 is inserted.

The optical receptacle 50 includes a first holder 62, and a second holder 63 longitudinally fitted in the first holder 62 and thus fixed. The first holder 62 and the second holder 63 include a hollow chamber HS longitudinally penetrating therethrough. Inside the chamber HS, a hollow cylindrical sleeve 61 is fitted. The rear end portion of the stub ferrule 71 is press-inserted in the second holder 63 and thus fixed. The first holder 62 and the second holder 63 may be constituted of stainless steel, copper, iron, nickel or the like, among which the stainless steel is preferable from the viewpoint of corrosion resistance and weldability.

The sleeve 61 retains the outer circumferential surface of the stub ferrule 71 press-inserted therein, as well as the outer circumferential surface of the plug ferrule 76 of the optical connector 75 inserted into the chamber HS through the frontal opening of the sleeve 61. The second holder 63 is fitted in the first holder 62 so as to receive the rear end portion of the stub ferrule 71 to be press-inserted therethrough. The sleeve 61 also serves to retain the frontal facet of the stub ferrule 71 and that of the plug ferrule 76, so as to keep those frontal facets butted to each other. In other words, the sleeve 61 serves to cause the optical axis of the optical fiber 72 and that of the optical fiber 77 to coincide stably and with high accuracy. Examples of a suitable material of the stub ferrule 71 include a ceramic material such as zirconia or alumina and a glass material, and those of the sleeve 61 include zirconia, alumina, copper, and glass.

As shown in FIG. 2, the wall thickness of the sleeve 61 is generally constant over the entire length thereof. In the case where the optical receptacle 50 is of the SC-type, the sleeve 61 has a wall thickness of equal to or more than 0.55 mm, and more preferably equal to or more than 0.55 mm and equal to or less than 0.75 mm. Here, the SC-type may be conformable to the IEC60874 standard or JIS C5973. In the case where the wall thickness of the sleeve of the SC-type optical receptacle is less than 0.55 mm, excessive connection loss of optical signals is prone to be incurred when a load is imposed, which may lead to degradation in performance of the SC-type optical receptacle 50 to a level below expectation. The IEC60874 stipulates the outer diameter of the holder of the SC-type optical receptacle. Also from the viewpoint of securing sufficient rigidity, the first holder 62 is required to be generally constituted of stainless steel, and to have a wall thickness of equal to or more than 0.3 mm. Accordingly, the first holder 62 is to have an outer diameter of approx. 4.6 mm, and the upper limit of the wall thickness of the sleeve 61 becomes approx. 0.75 mm.

Meanwhile, in the case where the optical receptacle 50 is of the LC-type, the sleeve 61 has a wall thickness of equal to or more than 0.25 mm, and more preferably equal to or more than 0.25 mm and equal to or less than 0.6 mm. Here, the LC-type may be conformable to the IEC61754 standard. In the case where the wall thickness of the sleeve of the LC-type optical receptacle is less than 0.25 mm, excessive connection loss of optical signals is prone to be incurred when a load is imposed, which may lead to degradation in performance of the LC-type optical receptacle 50 to a level below expectation. The IEC61754 also stipulates the outer diameter of the holder. Also from the viewpoint of securing sufficient rigidity, the first holder 62 is required to be generally constituted of stainless steel, and to have a wall thickness of equal to or more than 0.3 mm. Accordingly, the first holder 62 of the LC-type optical receptacle is to have an outer diameter of approx. 3 mm, and the upper limit of the wall thickness of the sleeve 61 becomes approx. 0.6 mm.

Figure 3A:
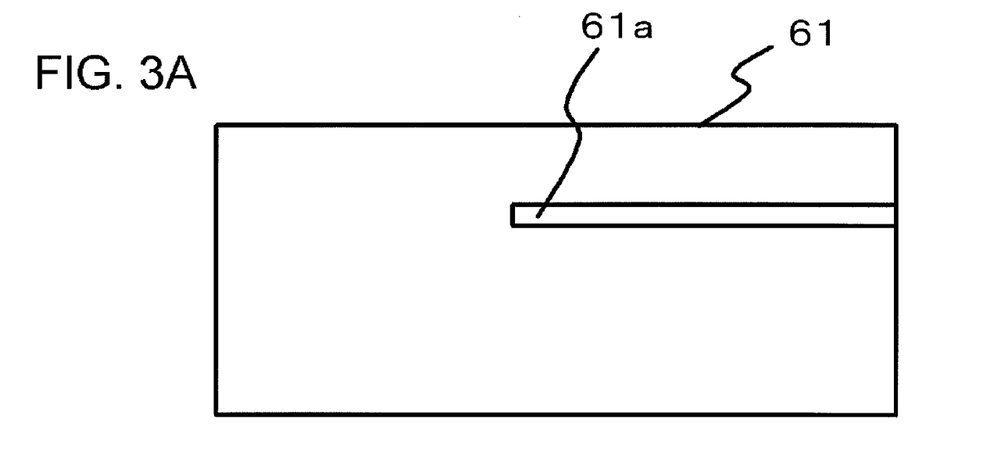
FIGS. 3A and 3B are schematic cross-sectional view showing a slit formed on a sleeve.
Figure 3B:
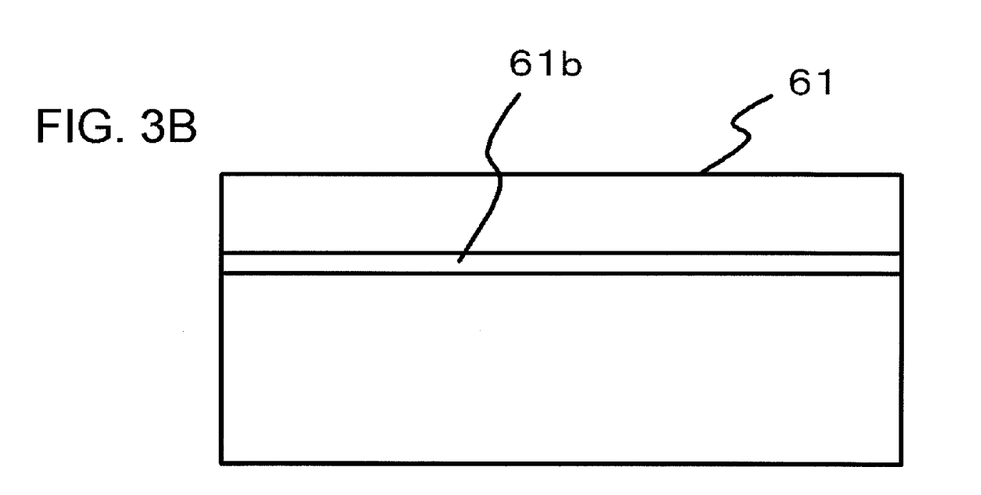

Further as shown in FIG. 3A or 3B, the sleeve 61 includes a slit 61a or 61b, formed so as to longitudinally extend from one of the open ends toward the other open end. In order to attain uniform radial retention force of the sleeve 61 to thereby stabilize the connection status of the stub ferrule 71 and the plug ferrule 76, it is preferable that, as shown in FIG. 3B, the slit 61b is formed all the way from an open end to the other open end. In the case where the slit 61a is provided only halfway of the sleeve 61 from one of the open ends as shown in FIG. 3A, a difference in retention force arises between the open end and the halfway point, which may degrade the stability of connection status between the ferrules 71 and 76.

The frontal facet 73a of the stub ferrule 71 is mirror-finished so as to form a curved surface having a predetermined curvature radius, to thereby minimize the connection loss of the optical signal. On the other hand, rear facet 73b of the stub ferrule 71 is mirror-finished so as to form an inclined surface of a predetermined angle with respect to the optical axis, to thereby suppress reflection of the optical signal.

Figure 4:
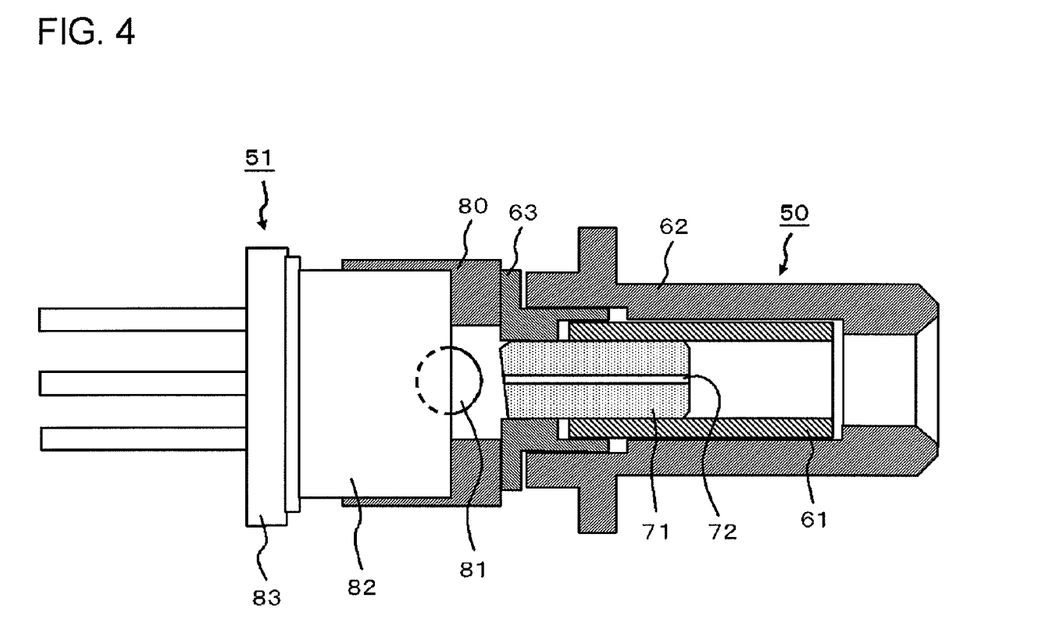
FIG. 4 is a schematic cross-sectional view showing a structure of an optical receptacle module.

FIG. 4 is a schematic cross-sectional view showing a structure of an optical receptacle module 51, which includes the optical receptacle 50. The optical receptacle module 51 includes the rear end portion of the optical receptacle 50, a cap with lens 82 having a lens 81, and a stem 83 to which an optical element (either or both of a photodetector and a light emitting element) is fixed. The cap with lens 82 is fixed to a third holder 80, which is fixed to the rear end face of the second holder 63 by laser welding or an adhesive.

In the optical receptacle 50 and the optical receptacle module 51, the wall thickness of the sleeve 61 is constant over the entire length thereof and is equal to or more than 0.55 mm in the case of the SC-type, and the wall thickness of the sleeve 61 is constant over the entire length thereof and is equal to or more than 0.25 mm in the case of the LC-type. Such structure provides sufficient load resistance.

Figure 5:
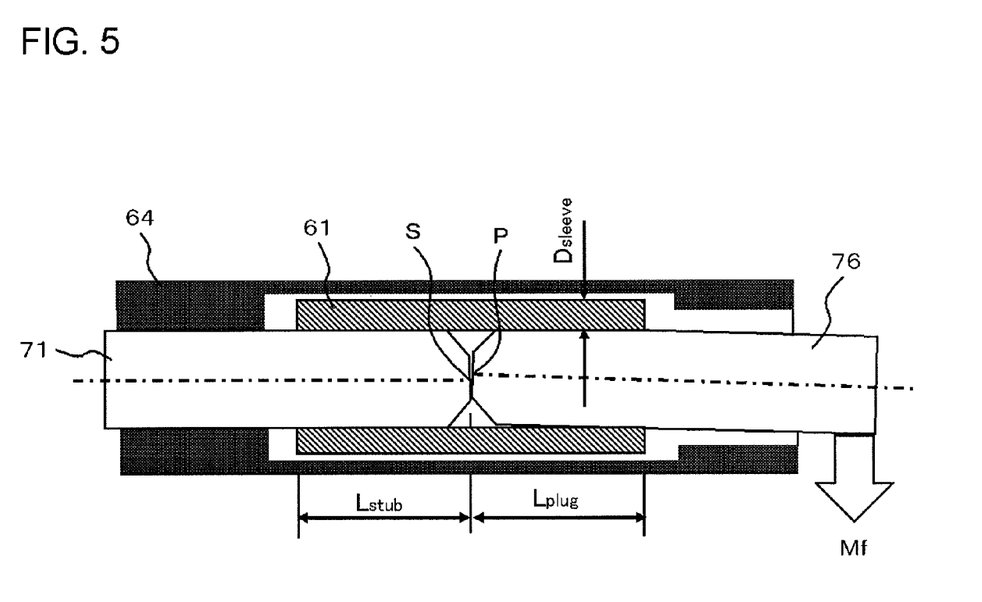
FIG. 5 is a schematic cross-sectional view showing a setup for an experiment for verifying the effect of the embodiment.

FIG. 5 is a schematic cross-sectional view showing a setup for an experiment for verifying the effect of this embodiment. As shown therein, the sleeve 61 is placed inside a holder 64, which simulates the combination of the first holder 62 and the second holder 63 shown in FIG. 4. The sleeve 61 includes a slit axially extending all the way from an open end thereof to the other open end. The sleeve 61 retains the stub ferrule 71 inserted through the rear opening of the holder 64, and the plug ferrule 76 of the optical connector 75 inserted through the frontal opening of the holder 64. The sleeve 61 also retains the frontal facet of the stub ferrule 71 and that of the plug ferrule 76 of the optical connector 75, so as to keep those frontal facets butted to each other. When a load Mf is applied under such state in a direction orthogonal to the optical axis of the plug ferrule 76 of the optical connector 75, the tip portion P of the optical fiber 77 in the plug ferrule 76 is displaced with respect to the tip portion S of the optical fiber 72 in the stub ferrule 71.

Figure 6:
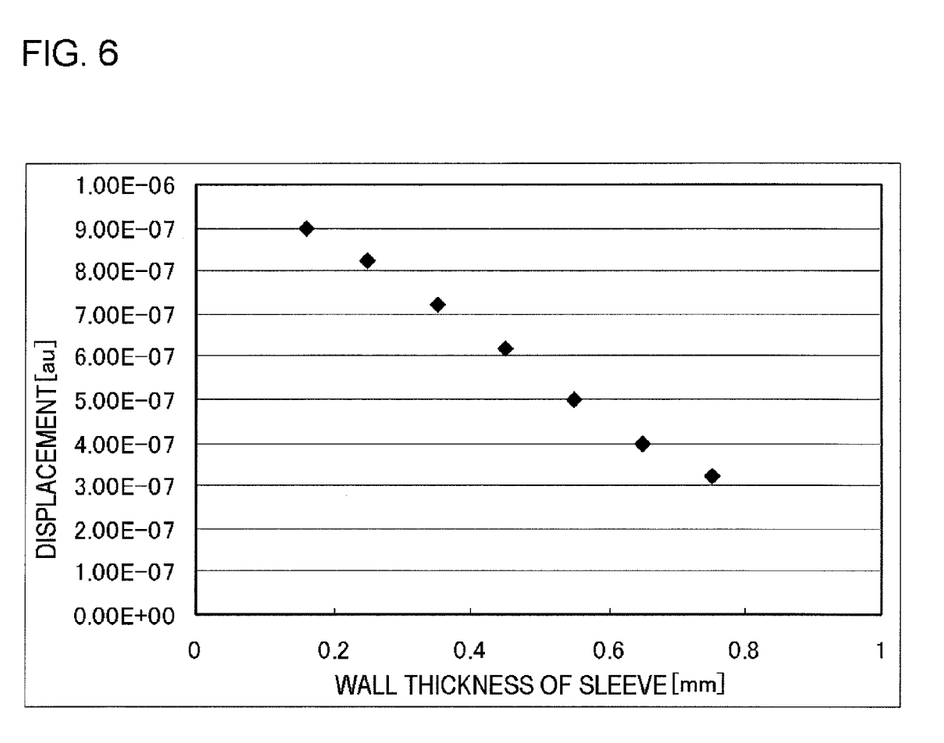
FIG. 6 is a graph showing a measurement result of displacement of an optical fiber corresponding to different wall thicknesses of the sleeve.

FIG. 6 is a graph showing a measurement result of the displacement of the optical fiber corresponding to different wall thicknesses of the sleeve 61. The plots in the graph of FIG. 6 indicate the displacement produced upon applying a load Mf of 1.5 weight pounds (lbf) perpendicularly to an optical fiber cord led out of the plug ferrule 76 of the optical connector 75 for the SC-type structure. The displacement values represent the relative positions of the tip portion P of the optical fiber 77 in the plug ferrule 76, with respect to the tip portion S of the optical fiber 72 in the stub ferrule 71.

Figure 7:
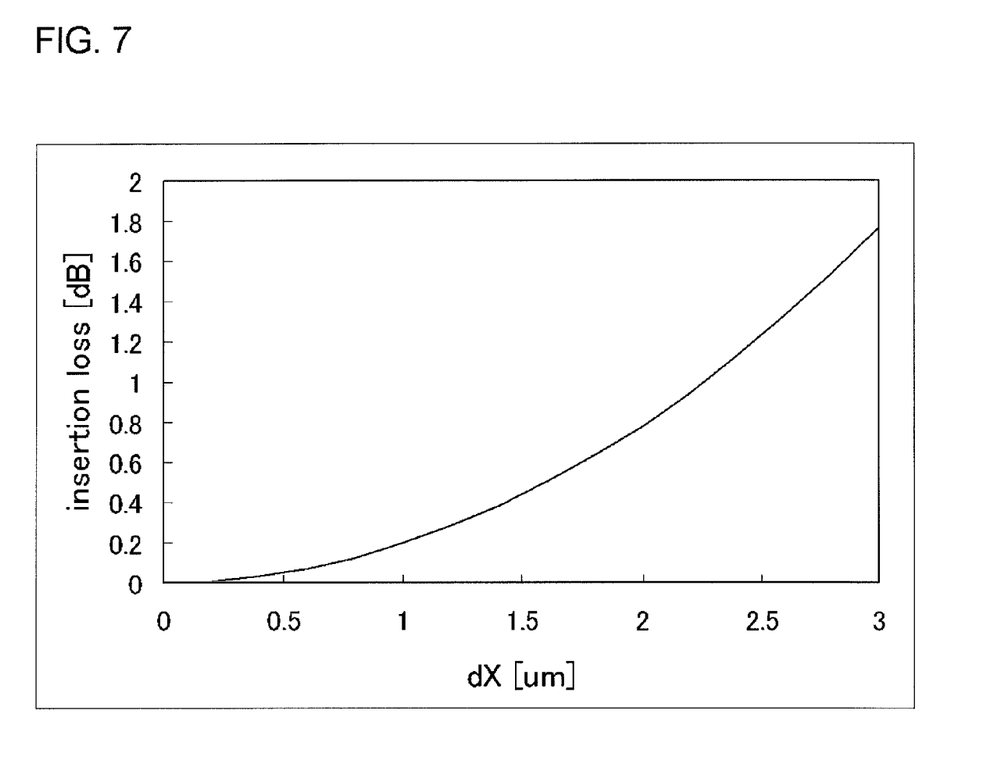
FIG. 7 is a graph showing calculated values of connection loss corresponding to the displacement of a tip portion of the optical fiber.

As is apparent from FIG. 6, the displacement of the optical fiber linearly decreases with the increase in wall thickness of the sleeve 61. This is because the increase in wall thickness of the sleeve 61 provides greater rigidity, and hence greater elastic retention force to the sleeve 61. FIG. 7 is a graph showing calculated values of the connection loss (insertion loss) corresponding to the displacement dX (μm) of the tip portion of the optical fiber. From FIG. 7, it is understood that the connection loss increases in a form of an exponential function, with the increase in displacement dX.

Figure 8:
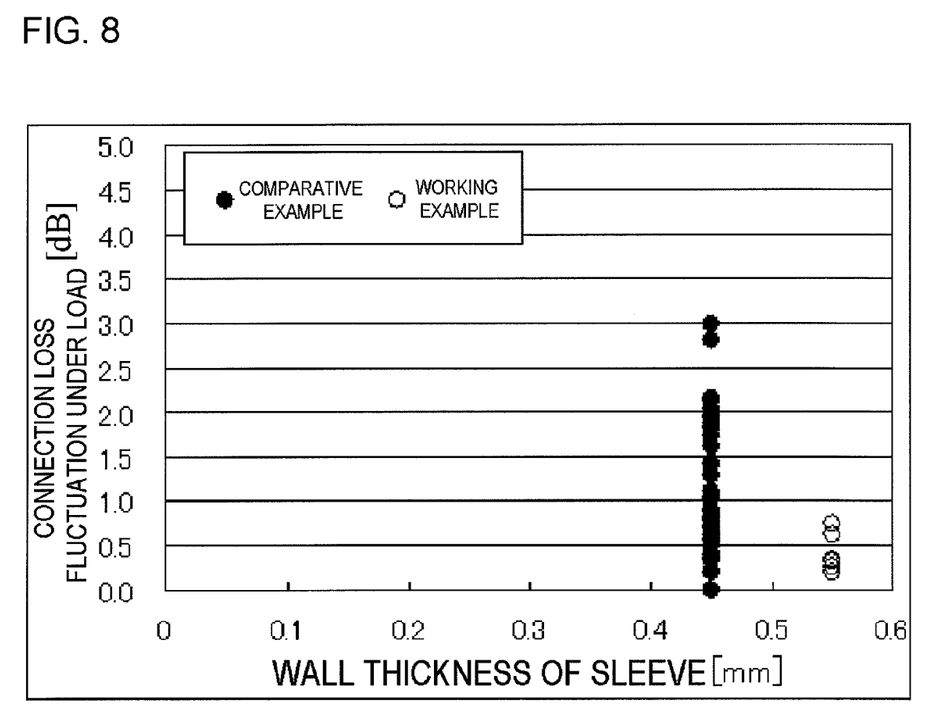
FIG. 8 is a graph showing experimental results from a working example conformable to the SC-type and a comparative example.

FIG. 8 is a graph showing experimental results from a working example conformable to the SC-type and a comparative example. The working example has the SC-type structure as shown in FIG. 4, and includes the sleeve 61 of 0.55 mm in wall thickness and 4.8 mm in length. The comparative example is of the same structure as the working example, except that the sleeve is 0.45 mm in wall thickness. In both of the working example and the comparative example, the fitting ratio of the stub ferrule 71 and the plug ferrule 76 (=Lstub: Lplug) is 1:1. The plots in the graph of FIG. 8 indicate the maximal fluctuation (dB) of the connection loss measured while the optical receptacle module 51 shown in FIG. 4 is rotated by 360 degrees about the central axis, under the load Mf of 1.5 weight pounds (lbf) perpendicularly applied to an optical fiber cord led out of the plug ferrule 76 of the optical connector 75 for the SC-type structure. In addition, such experiment was carried out with respect to a plurality of specimens composed of a plurality of patch cords.

In the graph of FIG. 8, blank circles indicate the fluctuation of the connection loss of the working example, and solid circles indicate the connection loss fluctuation of the comparative example. As is apparent from FIG. 8, the load resistance of the working example was superior, and the connection loss fluctuation of the working example was below 1.5 dB. On the contrary, the connection loss fluctuation of the comparative example is greater. Meanwhile, although a lower average value of the connection loss than the connection loss fluctuation of the present working example is cited in JP-A No. 2004-258164, it is to be construed that such result is derived from a different setup for the experiment.

Figure 9:
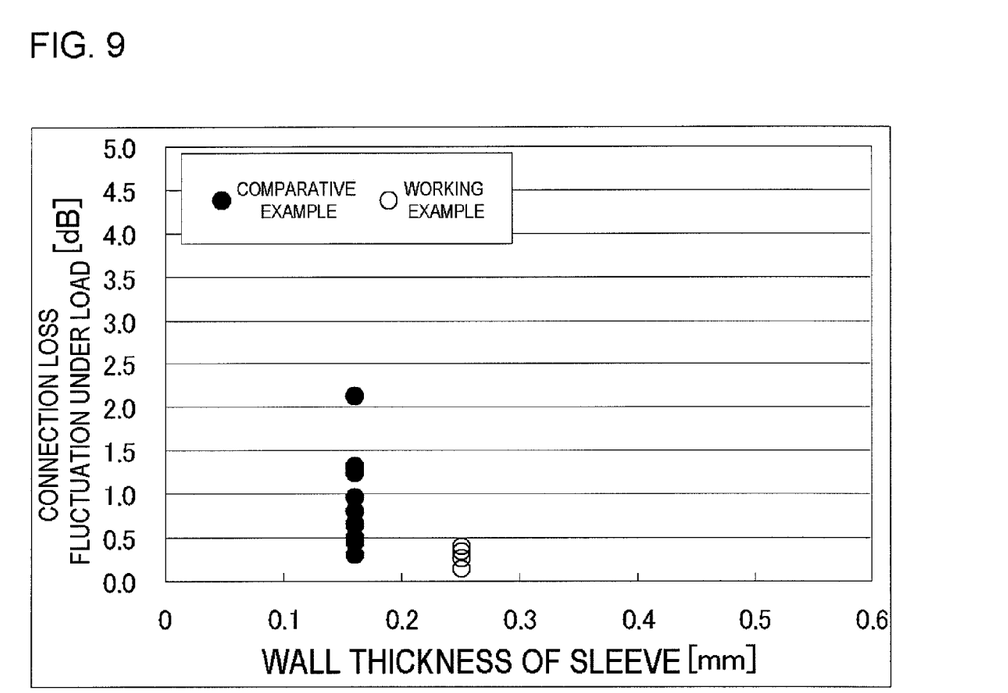
FIG. 9 is a graph showing experimental results from a working example conformable to the LC-type and a comparative example.

FIG. 9 is a graph showing experimental results from a working example conformable to the LC-type and a comparative example. The working example has the LC-type structure as shown in FIG. 4, and includes the sleeve 61 of 0.25 mm in wall thickness and 4.2 mm in length. The comparative example is of the same structure as the working example, except that the sleeve is 0.16 mm in wall thickness. In both of the working example and the comparative example, the fitting ratio of the stub ferrule 71 and the plug ferrule 76 (=Lstub: Lplug) is 1:1. The plots in the graph of FIG. 9 indicate the maximal fluctuation (dB) of the connection loss measured while the optical receptacle module 51 shown in FIG. 4 is rotated by 360 degrees about the central axis, under the load Mf of 0.5 weight pounds (lbf) perpendicularly applied to an optical fiber cord led out of the optical connector 75 for the LC-type structure. In addition, such experiment was carried out with respect to a plurality of specimens composed of a plurality of patch cords.

In the graph of FIG. 9, blank circles indicate the fluctuation of the connection loss of the working example, and solid circles indicate the connection loss fluctuation of the comparative example. As is apparent from FIG. 9, the load resistance of the working example was superior, and the connection loss fluctuation of the working example was below 0.5 dB.

In view of FIGS. 8 and 9, it is apparent that the distribution range of the connection loss fluctuation under the load is small, in both the SC-type working example and the LC-type working example. The distribution of the connection loss fluctuation in the comparative example may be assumed to originate from fluctuation in outer diameter of the plug ferrule to be inserted and in inner diameter of the sleeve, while it is understood that the SC-type working example and the LC-type working example are capable of suppressing the distribution range of the connection loss fluctuation.

The optical receptacle 50 and the optical receptacle module 51 according to the foregoing embodiment provide the following advantageous effects. In the case where the optical receptacle 50 is of the SC-type, the wall thickness of the sleeve 61 is constant over the entire length thereof, and is equal to or more than 0.55 mm. Likewise, in the case where the optical receptacle 50 is of the LC-type, the wall thickness of the sleeve 61 is constant over the entire length thereof, and is equal to or more than 0.25 mm. Because of such structure, the optical receptacle 50 and the optical receptacle module 51 provide sufficient load resistance despite the relatively simple structure that the wall thickness of the sleeve 61 is constant, and can be manufactured at a low cost.

In particular, in the case where the sleeve 61 includes the slit 61a formed all the way from one of the open ends to the other open end, the sleeve 61 can generally uniformly apply the radial elastic retention force over the entire length thereof, to thereby stabilize the connection performance between the stub ferrule 71 and the plug ferrule 76. In this case also, since the sleeve 61 has the optimal wall thickness as stated above, sufficient load resistance can be secured.

Although the embodiment of the present invention has been described referring to the drawings, the description is merely exemplary and various different structures may be adopted. For example, although the fitting ratio of the stub ferrule 71 and the plug ferrule 76 is set at 1:1 according to the embodiment, the fitting ratio may be modified to, for example, 1:1.5.

It is apparent that the present invention is not limited to the above embodiment, and may be modified and changed without departing from the scope and spirit of the invention.

What is claimed is:

1. An optical receptacle of an SC type, comprising:
a stub ferrule having a through hole in which an optical fiber is provided, wherein said optical receptacle optically couples a frontal facet of said stub ferrule and a frontal facet of a plug ferrule of an optical connector;
a holder including a hollow chamber longitudinally penetrating therethrough; and
a hollow cylindrical sleeve fitted in said chamber of said holder to thereby retain said frontal facets of said plug ferrule and said stub ferrule so as to keep said frontal facets butted to each other;
said stub ferrule fitted in said sleeve;
wherein a wall thickness of said sleeve is constant over an entire length thereof, and is equal to or more than 0.55 mm.

2. The optical receptacle according to claim 1, wherein said sleeve has a wall thickness equal to or more than 0.55 mm, and equal to or less than 0.75 mm.

3. The optical receptacle according to claim 2,
wherein said holder has a wall thickness equal to or more than 0.3 mm.

4. An optical receptacle of an LC-type comprising:
a stub ferrule enclosing therein an optical fiber, wherein said optical receptacle optically couples a frontal facet of said stub ferrule and a frontal facet of a plug ferrule of an optical connector;
a holder including a hollow chamber longitudinally penetrating therethrough; and
a hollow cylindrical sleeve fitted in said chamber of said holder to thereby retain said frontal facets of said plug ferrule and said stub ferrule so as to keep said frontal facets butted to each other;
wherein:
a wall thickness of said sleeve is constant over an entire length thereof, and is equal to or more than 0.25 mm;
said stub ferrule fitted in said sleeve;
a length of said sleeve is a sum of a first portion and a second portion, wherein a length of said first portion is a length of said stub ferrule within said sleeve; and
a ratio of the length of said first portion to a length of said second portion is 1:1.5.

5. The optical receptacle according to claim 4,
wherein said sleeve has a wall thickness equal to or more than 0.25 mm, and equal to or less than 0.6 mm.

6. The optical receptacle according to claim 5,
wherein said holder has a wall thickness equal to or more than 0.3 mm.

7. The optical receptacle according to claim 1,
wherein said sleeve includes a slit extending from an open end at one of longitudinal ends thereof toward the other open end.

8. The optical receptacle according to claim 7,
wherein said slit extends all the way from said open end to the other open end.

9. An optical receptacle module, comprising:
said optical receptacle according to claim 1; and
an optical element optically coupled with a rear end portion of a stub ferrule of said pair of ferrules.

10. The optical receptacle according to claim 4,
wherein said sleeve includes a slit extending from an open end at one of longitudinal ends thereof toward the other open end.

11. The optical receptacle according to claim 10,
wherein said slit extends all the way from said open end to the other open end.

12. An optical receptacle module, comprising:
said optical receptacle according to claim 4; and
an optical element optically coupled with a rear end portion of a stub ferrule of said pair of ferrules.

* * * * *